Figure 1:
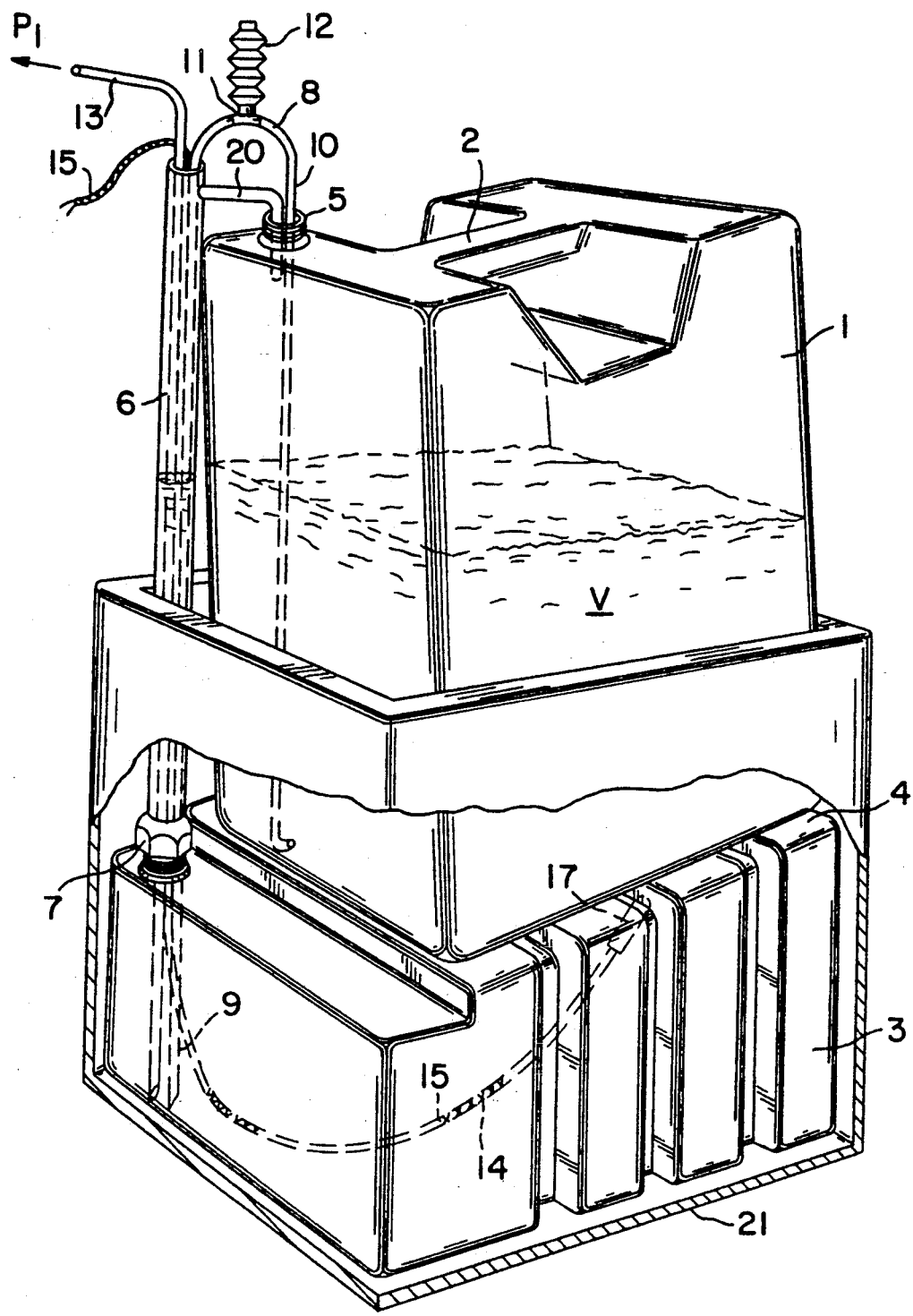

United States Patent [19]

Van Der Heyden

[11] Patent Number: 5,246,043

[45] Date of Patent: Sep. 21, 1993

[54] DEVICE FOR DETECTING A LIQUID LEVEL AND SYPHON DEVICE THEREFOR

[76] Inventor: Herman Van Der Heyden, Rostynedreef, 24, 9880 Aalter, Belgium

[21] Appl. No.: 791,050

[22] Filed: Nov. 12, 1991

[30] Foreign Application Priority Data

Nov. 14, 1990 [NL] Netherlands .................. 9002482

[51] Int. Cl.$^5$ .................................. B65B 31/04
[52] U.S. Cl. .................................... 141/65; 141/363; 141/375
[58] Field of Search ............... 141/94, 95, 65, 323, 141/374, 375, 363; 222/129, 155, 146

[56] References Cited

U.S. PATENT DOCUMENTS

| | | | |
|---|---|---|---|
| 1,078,175 | 11/1913 | Splaine | 141/95 X |
| 1,240,532 | 9/1917 | Barrow et al. | 141/323 X |
| 1,663,840 | 3/1928 | Havelick | 141/323 X |
| 2,604,294 | 7/1952 | Tamminga | 141/323 X |
| 2,771,101 | 11/1956 | Thompson | 141/375 X |
| 2,795,245 | 6/1957 | Meehan | 141/26 |
| 2,870,944 | 1/1959 | Campbell | 141/374 X |
| 2,897,853 | 8/1959 | Anstine | 141/95 |
| 3,794,428 | 2/1974 | Giesecke | 73/293 X |
| 3,875,941 | 4/1975 | Adair | 141/26 X |
| 4,806,902 | 2/1989 | Gana | 141/95 X |
| 4,860,804 | 8/1989 | Yamaguchi et al. | 141/65 X |
| 4,911,211 | 3/1990 | Andersen | 141/65 X |
| 4,934,420 | 6/1990 | Radna | 141/98 X |

*Primary Examiner*—Allan N. Shoap
*Assistant Examiner*—Christopher McDonald
*Attorney, Agent, or Firm*—Paul M. Denk

[57] ABSTRACT

A device for detecting a liquid level in a supply container provided with at least one opening in the top wall, which device is embodied with a transparent standpipe, wherein the bottom end of the standpipe is in open communication with the one leg of an inverse U-shaped syphon device, the other leg of which protrudes into the container, so being able to easy determinate the momentary liquid level in random containers for liquids, for example oil drums, containers for liquid chemical substances and the like, without the user having to touch the liquid or being thereby contaminated.

8 Claims, 2 Drawing Sheets

DEVICE FOR DETECTING A LIQUID LEVEL AND SYPHON DEVICE THEREFOR

The invention relates to a device for detecting a liquid level in a supply container provided with at least one opening in the top wall, which device is embodied with a transparent standpipe.

The invention has for its object to enable easy determination of the momentary liquid level in random containers for liquids, for example oil drums, containers for liquid chemical substances and the like, without the user having to touch the liquid or being thereby contaminated.

The device according to the invention is distinguished in that the bottom end of the standpipe is in open communication with the one leg of an inverse U-shaped syphon device, the other leg of which protrudes into the container.

By setting the syphon into operation, which can take place in arbitrary manner, liquid can be drawn out of the container, whereafter the liquid level becomes visible owing to the communicating action in the standpipe.

In a preferred embodiment the syphon device is provided at the highest point thereof with a pump in order to be able to fill the syphon by means of this pump with the liquid from the container, after the other leg has been placed in the container.

The device according to the invention likewise lends itself well to simultaneously removing the liquid out of the supply container. For this purpose the invention proposes fixing the standpipe in liquid-tight manner on a closed storage tank, wherein the one leg of the syphon and the take-off conduit extend through the standpipe to the bottom of the storage tank. The supply container for the liquid can hereby easily be replaced by a new supply container, while the take-off can take place continuously owing to the temporary storage under the standpipe.

In the case of toxic liquids it is recommended to provide the top end of the standpipe with an overflow pipe placed into the opening of the supply container so that spillage is ruled out.

In a further embodiment an alarm device can be arranged in the storage tank in order to give timely warning that the supply container is becoming empty, which can then be replaced.

For complete emptying of the supply container the storage tank is embodied with a sloping top surface so that the supply container can be placed on the storage tank such that the other leg of the syphon device can suck the supply container entirely empty Likewise in the case of toxic liquids it is recommended to place the storage tank with the standpipe and the supply container standing thereon in a receptacle-like, liquid-tight element which is open at the top. Any leakage or any liquid escaping from the containers due to spillage therefore remains in the receptacle-like element and cannot flow away. The invention further relates to a syphon device suitable for a device as described above.

Figure 2:
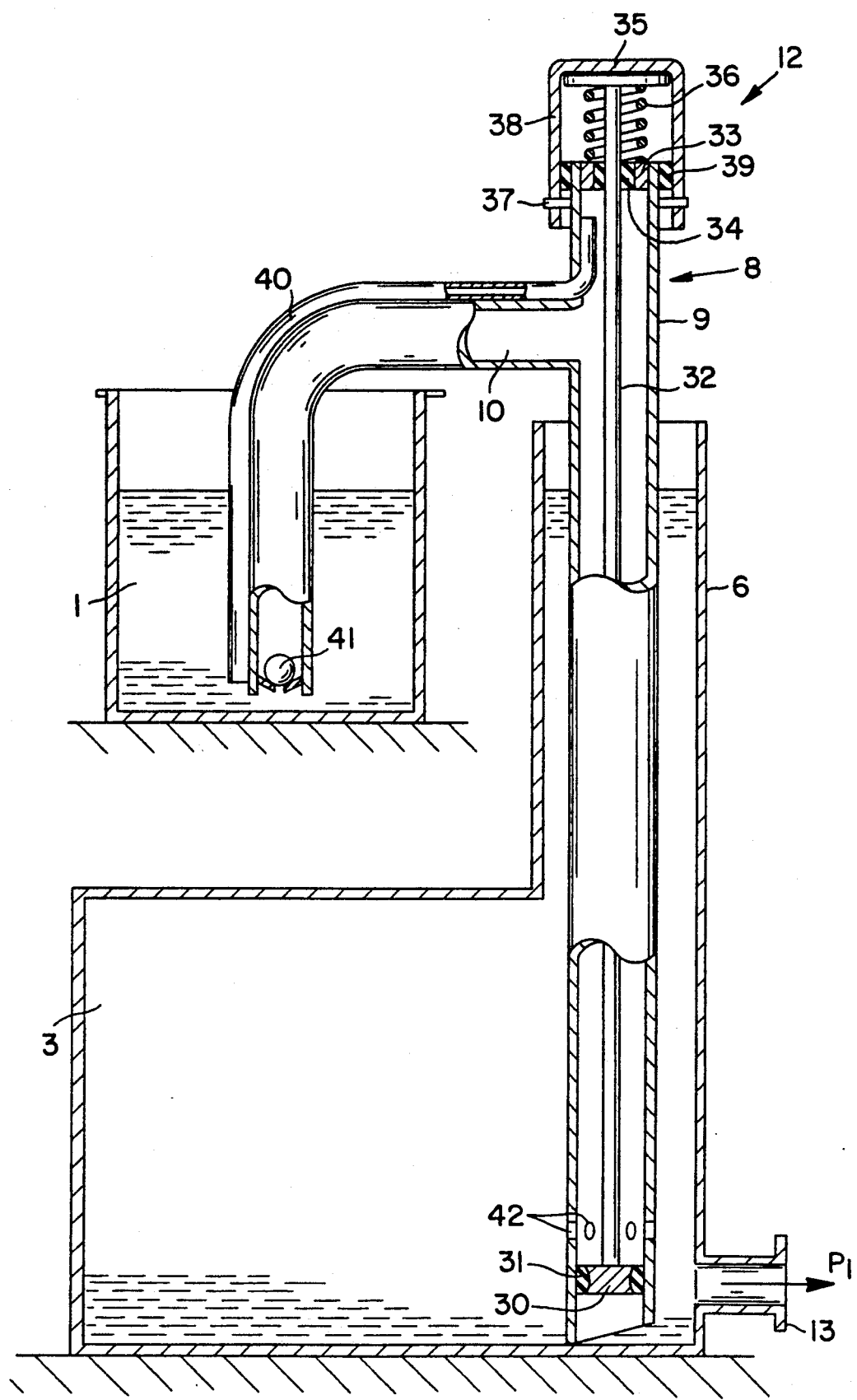

Above mentioned and other features of the invention will be further elucidated in the figure description hereinbelow of an embodiment. In the drawing:

FIG. 1 shows a perspective, upright view of a first embodiment of a supply container, a storage tank and a standpipe with syphon device according to the invention, FIG. 2 shows a schematic side view of a supply container and storage tank with standpipe with a second embodiment of the syphon device.

Designated with the numeral 1 in FIG. 1 is the supply container for a liquid V, which can for example take the form of a jerry can, which can be carried by hand by means of the hand-grip 2. The supply container 1 may of course have any suitable embodiment.

Designated with the numeral 3 is a storage tank which is provided with an inclined top surface 4, onto which the supply container 1 is placed such that the opening 5 of the supply container 1 lies on the low side of the container 1.

According to the invention a standpipe 6 is fixed in liquid-tight manner at 7 to the storage tank 3. The standpipe 6 is a tube of random material, preferably of transparent material, and has a length which protrudes above the height of the opening 5 of the container 1.

Arranged according to the invention is a syphon device 8 whereof the one leg 9 protrudes through the standpipe 6 into the storage tank 3, reaching close to the bottom thereof. The other leg 10 of the syphon device protrudes through the opening 5 of the supply container and reaches to the bottom of the container 1. Arranged at the highest point 11 of the syphon device is a hand pump 12 of random construction, such however that using the pump the syphon device 8 can be filled with liquid V.

In addition a take-off conduit 13 is placed through the standpipe 6 into the storage tank 3. The take-off conduit 13 can lead to a random user device such that a transport of liquid can take place through the conduit 13 in the direction of the arrow P1.

It is noted finally that an alarm device 14 in the form of a flexible line 15 is carried through the standpipe 6, wherein the free end of the flexible line 15 ends in a mercury switch 17 or the like, which has a low specific gravity relative to the liquid V, so that it undergoes an upward movement. As the liquid level becomes lower the position of the mercury switch 17 changes and brings about a connection between the two conductors received in the flexible line 15, which lead to an electrically fed signal generator (not shown here).

The above described device in FIG. 1 is particularly suitable for the removal of toxic or aggressive liquids V, which are supplied in a normally commercially available container 1. By removing the screw cap usually on the opening 5, the other leg 10 of the syphon device can be placed into the container as soon as this has been placed on the storage tank 3. By manually operating the pump 12 the syphon device 8 is filled such that liquid will flow from the supply container V into the storage tank 3 until an equilibrium exists between the liquid level in the supply container 1 and the standpipe 6. The liquid level in the supply container 1 is thereby easily detected visually if the standpipe 6 is transparent.

When taking off liquid via conduit 13 the liquid is withdrawn from the storage tank, which is however immediately augmented from the supply container 1 via the syphon device 8. When the supply container 1 is entirely empty, which can be seen in the standpipe 6 and due to the fact that the other leg 10 reaches to the bottom of the supply container 1 and this occupies a sloping position, this container 1 can be easily replaced by removing the syphon device 8 from the standpipe 6 and then pulling the other leg 10 out of the supply container 1. When another container 1 is placed, the syphon device 8 can be put back, the syphon device can be filled again with the pump 12 and liquid can be withdrawn in the manner described above via take-off conduit 13. The user can see momentarily what the liquid level is due to the standpipe 6. When a container 1 is empty, take-off of liquid V can continue as long as there is liquid present in the storage tank 3. When the supply container 1 is replaced too late, the floater body 17 of the alarm will fall too low in the storage tank 3, so that a signal is generated that the minimum level in the tank 3 has been reached.

It is noted finally that for safety reasons an overflow pipe 20 is arranged at the top end of the standpipe 6 which reaches into the opening 5 of the supply container 1. When liquid is pumped through too far by the pump 12 this liquid is automatically carried back via the overflow pipe 20 into the container 1.

Another safety measure is placing of the storage tank 3 in a receptacle-like element 21, so that leakage of liquid from either the supply container 1, from the standpipe 6 or from the storage tank 3 remains limited within the enclosure of the receptacle-like element 21.

FIG. 2 shows a development of a possible syphon device suitable for the device as described above.

It is known that syphon devices are difficult to vent since use is typically made of the liquid flow through the syphon pipes to carry away the air bubbles. If this flow is meagre, the air then often remains behind in the upper part of the syphon device, which considerably diminishes the good operation thereof. FIG. 2 shows a possible embodiment with which this drawback can be obviated.

In this embodiment the same components are designated with the same reference numerals.

The one leg 9 again protrudes into the standpipe 6 and reaches to the bottom of the storage tank 3. The other leg 10 of the syphon protrudes in the supply container 1.

The one leg 9 of the syphon device 8 has a circular-cylindrical form, in which leg is received a plunger 30 which closes sealingly against the inside wall of the one leg 9 using a seal ring 31. The plunger is joined to a plunger rod 32 and at the upper end of the one leg 9 is sealingly guided through the closed top wall 33 of the one leg 9. For this purpose the top wall 33 is embodied with a sealing ring 34. The plunger rod 32 is provided at the top with a handle 35. Received between the handle 35 and the top wall 33 of the one leg 9 is a coil spring 36.

The top end of the one leg 9 is provided with coupling means, for example a bayonet fitting 37 for fastening a cover 38 over the handle 35, wherein the inside of the cover 38 connects sealingly onto a sealing ring 39 on the outer periphery of the wall 33.

The length of the plunger rod 32 is such that in the position shown in FIG. 2 the plunger 30 lies beneath a number of passage openings 42 in the lower end of the one leg 9.

The figure further shows that the other leg 10 connects to the one leg 9 just below the top end. The other leg 10 is also provided with an overflow pipe 40, the top end of which debouches directly below the top wall 33 of the one leg 9 and the other end debouches close to the bottom end of the other leg 10. Finally, it is noted that a non-return valve 41 is arranged in the bottom end of the other leg 10.

The operation of the syphon device 8 according to FIG. 2 is as follows.

After an empty supply container 1 has been exchanged for a full container 1 the syphon device 8 may need to be vented if it has been completely emptied. For this purpose the cover 38 is removed and the plunger 30 can be pulled upwards through the one leg 9 by pulling the handle 35 upward. The air situated above the plunger 30 is pumped back initially via the overflow pipe 40 into the supply container 1, where it will disappear. During the upward movement liquid from the storage tank 3 will be situated in the one leg 9 on the underside of the plunger 30. During the downward movement of the plunger 30 liquid from the supply container 1 is sucked along via the non-return valve in the other leg 10 into the leg 9, whereby the syphon device 8 fills itself. Residual air can hereby still possibly be situated in the syphon, collecting at the top end of the one leg 9. By again moving the plunger 30 upward the air can be pressed away via the overflow pipe 40, wherein the liquid above the plunger 30 is held back by the non-return valve in the other leg 10. After complete venting the plunger 30 can be placed in the position shown by arranging the cover 38 via the bayonet fitting 37. The syphon is now ready for the normal syphoning operation and if liquid is withdrawn from the storage tank 3 via the drain stump 13, this liquid is automatically augmented from the supply container 1. The level of the supply container 1 can be read in the standpipe 6. The danger of leakage at the passage of the plunger rod 32 through the top end of the one leg 9 is doubly secured in effective manner by sealing rings 34 and 39 respectively When the container 1 is exchanged again, the above stated procedure does not necessarily have to be performed in entirety but, by removing the cover 38, the plunger 30 can be brought to the position just above the passage openings 42 as a result of the action of the pressure spring 36. Sufficient liquid is hereby retained in the respective legs 9 and 10 of the syphon device 8 when the syphon is removed, whereby, when the syphon device is again set into operation, venting, if air has indeed found its way into the leg 9, can be carried out more rapidly via the overflow pipe 40 by pulling the plunger 30 slightly upwards.

The venting operation can be improved still further by making the diameter of the one leg 9 significantly larger than that of leg 10, for example one and a half times larger.

The invention is not limited to the above described embodiments.

I claim:

1. A device for detecting a liquid level in a supply container, said supply container having a top wall, said top wall provided with at least one opening therethrough, said device having a transparent standpipe, said standpipe having a bottom end, an inverted U-shaped siphon device, said siphon device having a first leg and a second leg, the bottom end of the standpipe being in open communication with the first leg of the U-shaped siphon device, the second leg of the siphon device protruding into the supply container, said siphon device having a highest point between its first and second legs, and a pump means provided at the highest point of the said siphon device, a closed storage tank provided beneath the supply container, a take-off conduit for tapping of liquid within the supply container communicating therewith, the bottom end of the standpipe being fastened in a liquid type connection to the closed storage tank, and the first leg of the siphon device and the take-off conduit extending through the standpipe for extension into proximity with the bottom of the closed storage tank.

2. The device as claimed in claim 1, characterized in that said standpipe having a top end, an overflow pipe extending into the top end of the standpipe, and said overflow pipe extending into the opening of the supply container.

3. The device as claimed in claim 2 and further characterized in providing an alarm device being arranged within the closed storage tank, and providing for a signal when a minimum level of liquid is attained within said closed storage tank.

4. The device as claimed in claim 3, and further characterized in that said alarm device comprising a switch floating upon the level of the liquid, and an electric alarm circuit, connecting with the switch, to provide for energization of said alarm device when a minimum level of liquid within the closed storage tank is attained.

5. The device as claimed in 1, and further characterized in that said closed storage tank is formed as a receptacle-like, liquid-type tank having an opening provided though its top surface.

6. The device as claimed in claim 5 wherein said storage tank having an inclining upper surface, whereby said supply container is supported upon said inclining upper surface of the said storage tank.

7. The device as claimed in claim 6, and further characterized in that said standpipe connects with the closed storage tank at the approximate lowest inclining portion of the upper surface for the closed storage tank.

8. The device as claimed in claim 1, and further including a suction cylinder pump, said suction cylinder pump being mounted upon said standpipe.

* * * * *